(No Model.)
T. G. BROOKE.
CORN AND FODDER BINDING DEVICE.
No. 277,214. Patented May 8, 1883.
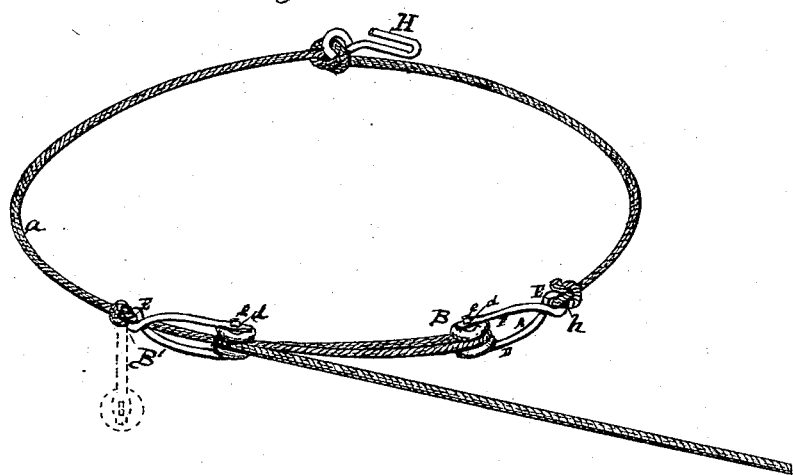
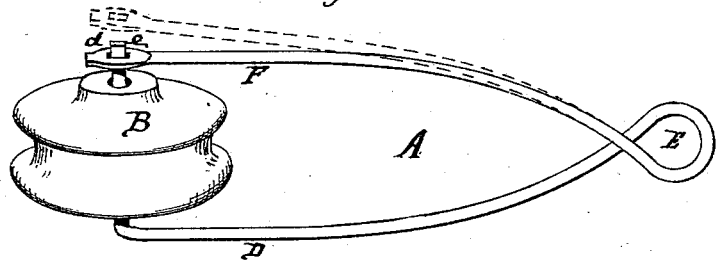
Witnesses:
I. H. McDonald
Percy Aughe
Inventor,
Thomas G. Brooke
by. C. O. Johnston
atty.

UNITED STATES PATENT OFFICE.

THOMAS G. BROOKE, OF NEWARK, OHIO.

CORN AND FODDER BINDING DEVICE.

SPECIFICATION forming part of Letters Patent No. 277,214, dated May 8, 1883.

Application filed December 15, 1880. (No model.)

*To all whom it may concern:*

Be it known that I, THOMAS G. BROOKE, a citizen of the United States, residing at Newark, in the county of Licking and State of Ohio, have invented certain new and useful Improvements in Corn and Fodder Binding Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in devices for binding corn and fodder shocks; and it consists in an elastic metallic frame, to which the binding-rope is attached, holding a sheave or pulley, one side of which frame is arranged to open readily by pressure, and close automatically, to admit of easily reaving the binding-rope upon the sheave or pulley; also, in certain principles and details of construction, hereinafter more specifically described and shown. Its object is to provide a simple, economical, and convenient device for compressing shocks of corn or fodder until a permanent binder of wire or cord can be placed around them.

In the drawings, Figure 1 is a view representing my binder as it appears when in position around the shock. Fig. 2 is a view of the metallic frame holding the sheave or pulley.

The frame A is preferably composed of elastic steel wire, in a single piece, bent around in the form of a loop, one of its sides or legs, D, being slightly longer than the other, and the projecting end bent at right angles with the wire to form the spindle or axis for the pulley B, which is placed thereon. The opposite side, F, of this frame is flattened at the end, and provided with a hole or mortise, $d$, for receiving the tenon or end of spindle $e$. The rope or binding-cord $a$ is attached to the loop E at the opposite end of the frame, as shown at $h$, Fig. 1.

The manner of operating my device is as follows: I seize the frame by the pulley or sheave end and thrust it into the shock. I then carry the rope around the shock, returning to the pulley, and reeve the rope upon the pulley by pressing it between the pulley and the side F of the frame. The latter, being elastic, will yield sufficiently, as shown by dotted line in Fig. 2, to permit its passage, and will automatically resume its former position, thereby enabling the rope to be quickly and easily rove, without resorting to the more tedious process of threading it from the end. The rope is then drawn taut, and the shock is easily compressed to the required extent for the permanent binder. In case, however, that the shock is large and a greater compressing force is required, an additional frame or block of similar construction may be attached to the binding-rope at a suitable distance from the first, as shown at B', Fig. 1, and the rope, after being placed upon the first pulley, may be rove upon the second in the same manner, and the compressing-power thereby greatly augmented, enabling one man to easily perform the work of several when operating in the ordinary manner.

One or more additional pulleys may be employed, according to the power required. After the shock is sufficiently compressed the end of the rope is carried around and secured by the hook H until the permanent binder is adjusted. A clamp or any other suitable device may, however, be used instead of the hook H.

It will be observed that by the peculiar construction of my frame a spring-opening is provided at one side of the pulley for instantly allowing the rope to be placed upon the pulley without impairing the strength of the device, both ends of the pulley-axle being firmly supported when the power is applied.

Having thus described my invention, what I claim, and desire to secure by Letters Patent, is—

1. In a shock-binder, the combination of the pulley B, elastic metallic frame made in a single piece, and having the yielding opening at one side of the pulley, with the binding-rope, substantially as described.

2. In a shock-binder, the combination of the binding-rope with two or more pulleys arranged in elastic metallic frames, each formed of a single piece, and having a yielding automatically-closing opening at one side of the pulley, substantially as herein described.

In testimony whereof I affix my signature in presence of two witnesses.

THOS. G. BROOKE.

Witnesses:
JOHN H. JAMES,
C. D. BARROWS.